March 30, 1948. W. STELZER 2,438,723
HYDRAULIC BRAKE MECHANISM
Filed Oct. 12, 1944 2 Sheets-Sheet 1

INVENTOR
WILLIAM STELZER
BY
ATTORNEYS

March 30, 1948.  W. STELZER  2,438,723
HYDRAULIC BRAKE MECHANISM
Filed Oct. 12, 1944  2 Sheets-Sheet 2

INVENTOR
WILLIAM STELZER
BY
ATTORNEYS

Patented Mar. 30, 1948

2,438,723

UNITED STATES PATENT OFFICE 2,438,723

HYDRAULIC BRAKE MECHANISM

William Stelzer, Summit, N. J.

Application October 12, 1944, Serial No. 558,407

10 Claims. (Cl. 60—54.5)

This invention relates to hydraulic brake mechanisms, and more particularly to a vehicle booster motor brake mechanism of the type wherein displacement of fluid from the vehicle master cylinder energizes a motor which cooperates with the pressure of the master cylinder fluid to generate a higher or boosted brake-applying pressure.

Several types of booster brake mechanisms of the general type referred to have been developed, the fluid from the master cylinder usually actuating a piston which assists in generating the boosted hydraulic pressure for applying the brakes, the piston being utilized for controlling the actuation of a motor which performs the remainder of the work in boosting the hydraulic pressure. The motors employed usually are of the differential fluid pressure operated type, and the piston operated by the master cylinder effects movement of the valves for controlling the motor.

In most previous mechanisms, a lever has been arranged to be actuated by the piston to operate two valves, one of which controls the connection of the motor to a source of relatively low pressure and the other of which controls connection of the motor to a source of relatively high pressure. It usually is necessary for the valve-operating lever to overcome substantial force in order to open the high pressure valve, and accordingly the operator feels substantial resistance to the operation of the brake pedal in merely performing the function of bringing the booster motor into operation. This results in a "lumpy" and undesirable operation. Moreover, it is usually the practice to provide an arrangement wherein movement of the lever in a brake-applying operation of the pedal first seats the vacuum valve against spring pressure, and then opens the air valve. The opening of the air valve relative to the vacuum valve is not positively controlled and the relative movements of the valves depends largely on the mode of operation of the brake pedal.

An important object of the present invention is to provide a booster brake mechanism wherein the valves for the booster motor are controlled in a highly advantageous manner to provide for instantaneous movement of the motor to operation of the brake pedal, and to provide a degree of smoothness and maneuverability in operation of the motor which heretofore has been unattainable.

A further object is to provide such a mechanism wherein the operations of the two valves are positively related to each other and are capable of regulation when the apparatus is installed to provide for a particularly smooth and efficient operation of the apparatus.

A further object is to provide a booster brake mechanism wherein a substantially reduced force is necessary for opening the higher pressure valve, and wherein the relative functioning of the two valves is capable of being so regulated as to slightly overlap them so that each valve closes very slightly behind the initial opening movement of the other valve, thus providing the motor with a highly efficient degree of maneuverability with no gap at the point where one valve opens and the other closes.

A further object is to provide a booster brake mechanism having the advantages referred to, together with means for regulating the "cut-in" point of the motor, that is, the point at which the motor becomes operative after displacement of fluid from the master cylinder has commenced.

Other objects and advantages of the invention will become apparent during the course of the following description.

In the drawings I have shown one embodiment of the invention. In this showing:

Figure 1:
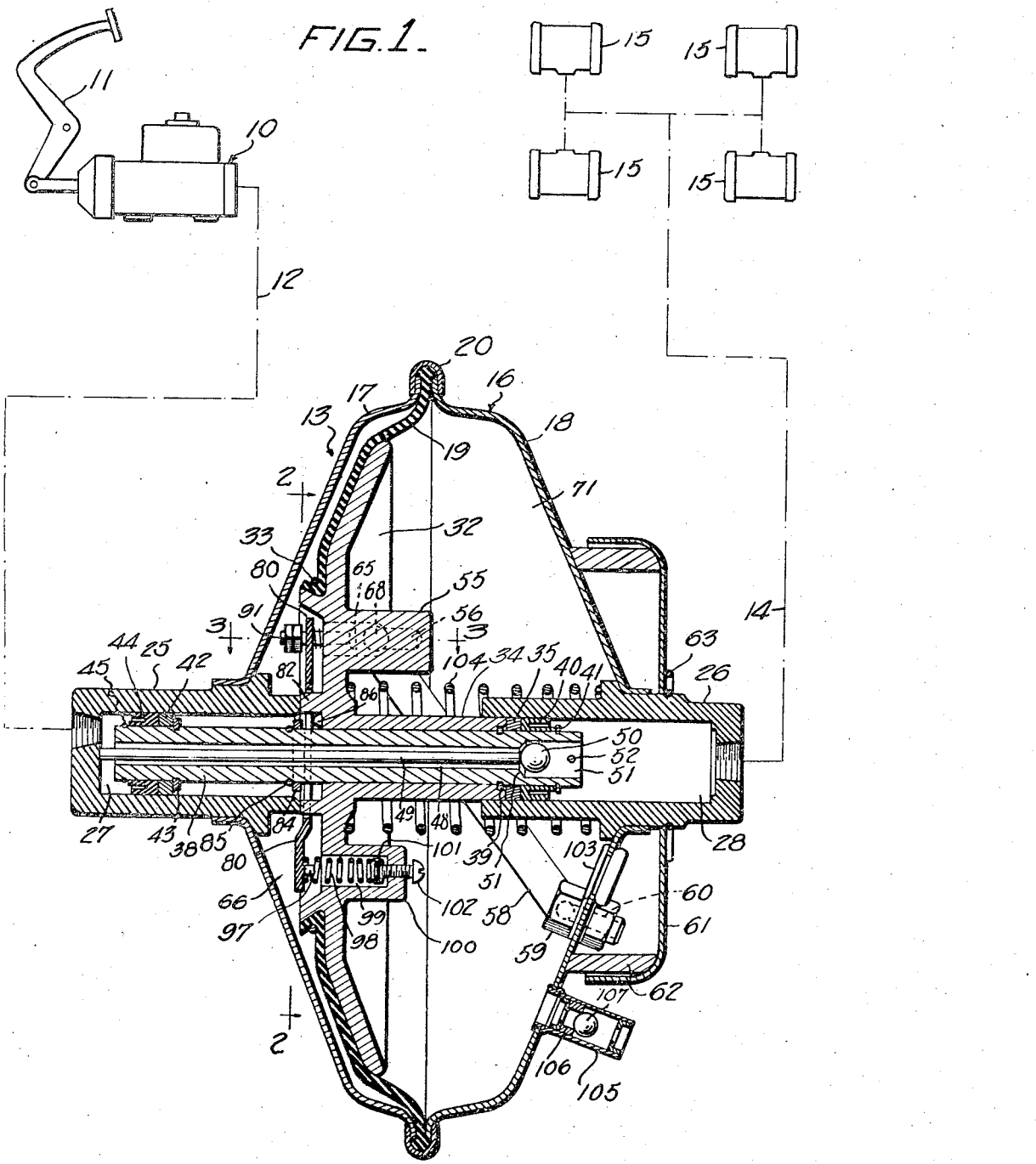
Figure 1 is an axial sectional view through the booster unit, the master cylinder and wheel cylinders, and the lines connecting them to the booster mechanism being diagrammatically represented.

Referring to Figure 1 the numeral 10 designates a conventional master cylinder as a whole having the usual piston (not shown) therein for displacing fluid therefrom, the piston being operable by the usual brake pedal 11. Fluid displaced from the master cylinder flows through a line 12 to the booster unit designated as a whole by the numeral 13, and from such unit brake lines 14 provide for the flow of the boosted hydraulic fluid to the wheel cylinders 15 of the vehicle.

Figure 2:
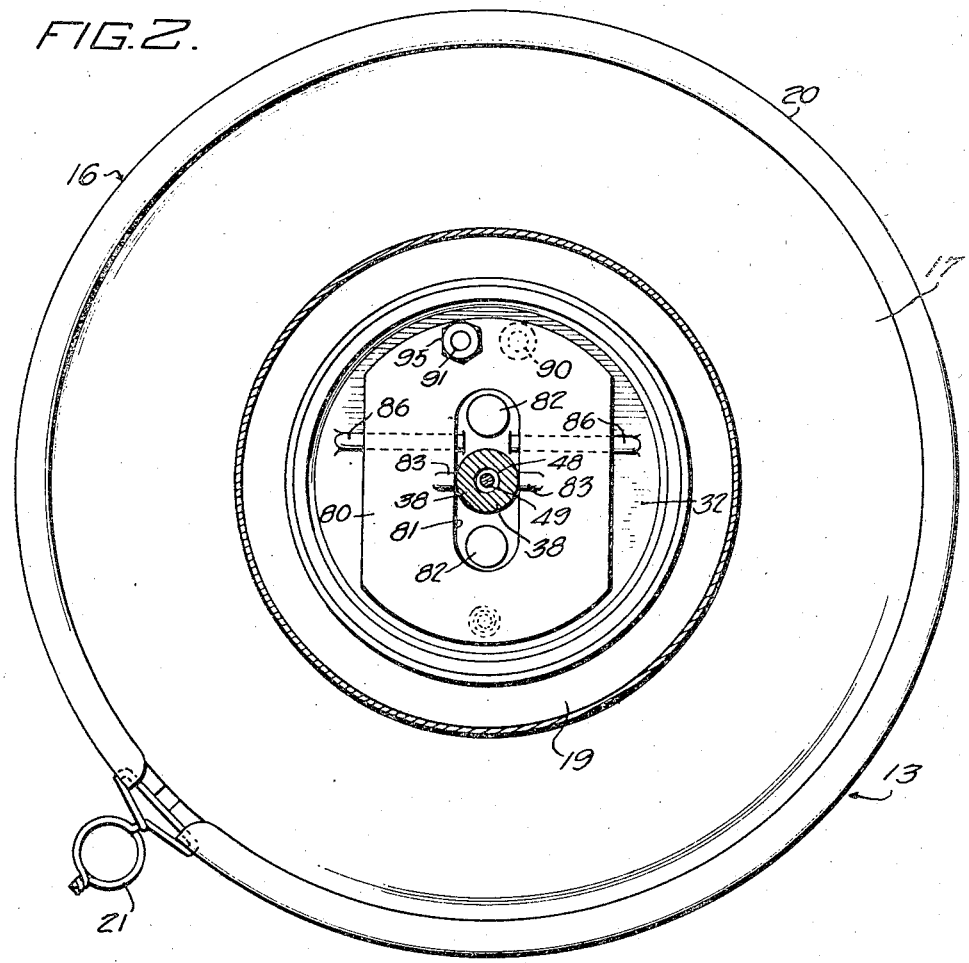
Figure 2 is a transverse sectional view taken substantially on line 2—2 of Figure 1.

The booster unit comprises a motor indicated as a whole by the numeral 16 and comprising cupped casing sections 17 and 18 between the peripheral portions of which is arranged the peripheral portion of a suitable diagram 19. The casing sections are maintained in position against the diaphragm by a split clamping ring 20 having its ends secured together in any suitable manner, for example, by a connecting wire 21 (Figure 2.)

The casing section 17 is connected to an axial cylinder 25 to the outer end of which the line 12 is connected in the usual manner. The casing section 18 carries a similar axial cylinder 26 to which the line 14 is also connected in the usual manner. The outer end of the cylinder 25 forms a low pressure chamber 27 into which fluid flows from the master cylinder to effect brake application, while the outer end of the cylinder 26 forms a high pressure chamber 28 in which the boosted hydraulic pressure is generated for delivery through the lines 14.

A diaphragm plate 32 is secured to the diaphragm 19 in any desired manner, for example, by a connecting ring 33. The plate 32 carries a preferably integral plunger sleeve 34 projecting therefrom into the adjacent end of the cylinder 26. The end of the plunger sleeve 34 engages a ring 35 to move it toward the right as viewed in Figure 1 upon operation of the motor as will become apparent.

A piston 38 is slidable through the plunger sleeve 34 and through the ring 35, and a snap ring 39 is connected to the piston 38 and recessed into the end of the plunger sleeve 34 to permit free limited movement of the piston 38 toward the right relative to the plunger sleeve 34. A seal 40 surrounds the right hand end of the piston 38 as viewed in Figure 1 and has one end engaged by the ring 35, the other end of the seal 40 contacting a snap ring 41 carried by the piston 38. The left hand end of the piston 38 as viewed in Figure 1 extends into the cylinder 25 and such end of the piston 38 is surrounded by a ring 42 fixed against movement in one direction by a snap ring 43 on the piston 38, the other side of the ring 42 contacting a seal 44 fixed against displacement from the piston 38 by a snap ring 45. The piston 38 and seal 44 define the right hand limit of the low pressure chamber 27 as will become apparent.

The piston 38 is provided with an axial bore 48 therethrough and a rod 49 is arranged in such bore. One end of this rod is engageable with the closed end of the cylinder 25 when the piston 38 is in its "off" position, the other end of the rod, under such conditions, maintaining a ball valve 50 off its seat 51 for the free flow of brake fluid through the bore 48 upon initial operation of the brake pedal, as will be described later. The ball 50 is arranged in an enlarged recess 51 in the corresponding end of the piston 38 and is prevented from being displaced from such recess by a retaining pin 52.

Figure 3:
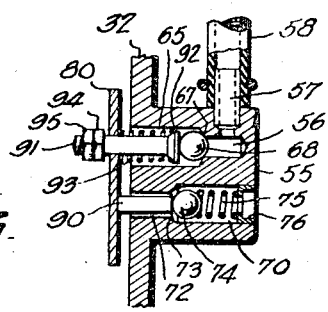
Figure 3 is an enlarged detail sectional view on line 3—3 of Figure 1 showing the valve arrangement in detail.

The valves for operating the motor are arranged within a boss 55 preferably cast integral with the plate 32. Referring to Figures 1 and 3, the boss 55 is provided with a bore 56 communicating through a nipple 57 with a hose or similar flexible pipe 58. As shown in Figure 1, the pipe 58 is connected with a fitting 59 mounted in the casing section 18 and having a passage 60 therethrough. In the present instance, the source of higher pressure is the atmosphere, and accordingly the passage 60 opens into an air cleaner casing 61 having an air cleaning element 62 therein, the casing 61 being suitably fixed in position on the cylinder 26 by a wire 63.

The bore 56 (Figure 3) communicates through a larger bore 65 with the motor chamber 66 (Figure 1) at one side of the diaphragm 19. The junction of the bores 56 and 65 form a valve seat 67 engageable by a ball or other valve 68 to cut off the flow of air from the atmosphere into the motor chamber 66.

The boss 55 is also provided with a bore 70 which communicates with the other motor chamber 71 at the opposite side of the diaphragm 19. The bore 70 communicates through a smaller bore 72 with the motor chamber 66 and the valve seat 73 formed between these bores is engageable by a ball or other valve 74. This ball is urged toward its seat by a spring 75 engageable with an aperture spring seat 76 pressed into the bore 70.

The controlling of the valves 68 and 74 is accomplished through a lever 80. This lever is provided with a vertically elongated central opening 81 which straddles the piston 38 and also receives a pair of positioning lugs 82 preferably formed integral with the plate 32 to prevent rotation of the lever 80 in its own plane. Intermediate its ends, the lever 80 is provided with opposite bulged portions 83 engageable against a ring 84 mounted on the piston 38 and retained in position by a snap ring 85. Upon movement of the piston 38, the ring 84 obviously contacts with the bulged portions 83 of the lever 80 to effect movement thereof. Above the axis of the piston 38, the plate 32 is provided with transverse ribs 86 engageable against the lever 80 to act as a fulcrum therefor.

At one side of the vertical center thereof, the lever 80 adjacent its upper end engages a rod 90 which contacts the ball 74 to normally retain the ball 74 unseated, and accordingly the motor chambers 66 and 71 normally communicate with each other. At the opposite side of its vertical center, a valve operating rod 91 projects through the lever 80 and is provided at its inner end with a head 92 engageable with the valve 68 to seat it. A spring 93 surrounds the rod 91 and is engageable at its ends respectively with the head 92 and lever 80. An adjusting nut 94 and a jamb nut 95 are threaded on the stem 91 as shown in Figure 3 to limit movement of the lever 80 relative to the stem 91, there normally being clearance between the nut 94 and the lever 80 of a width and for a purpose to be described.

The lower end of the lever 80 carries a pin 97 engageable in one end of a spring 98 arranged in a bore 99 formed in a boss 100, preferably integral with the plate 32. The other end of the spring 98 engages a seat 101 adjustable by a screw 102 accessible upon the removal of a rubber plug 103 from the casing section 18 when the device is assembled and tested. The spring 98 is desirable for adjusting the functioning of the valve mechanism, and it will become apparent that when the piston 38 is displaced toward the right, the lever 80 will be rocked in a counterclockwise direction about its fulcrum 86 to seat the vacuum valve 74 and open the air valve 86 whereupon the pressure-movable unit of the motor will move toward the right. A reversal of such operation will result in closing the air valve 68 and opening the vacuum valve 74 to equalize pressures in the motor and a spring 104 operates, under such conditions, to return the pressure movable units and the elements associated therewith to the "off" position.

As previously stated, the valve 74 (Figure 3) is normally open to equalize pressure in the chambers 66 and 71. If the source of higher pressure is the atmosphere, as illustrated, the chamber 71 is connected to a source of partial vacuum, preferably that of the intake manifold of the motor vehicle engine. For this purpose, a nipple 105 is connected to the casing section 18 and is provided with a rubber or similar seat 106 engaged by a check valve 107, the nipple 105 being connected to the intake manifold and the ball 107 functioning to automatically seat when pressure in the intake manifold rises. This obviously prevents an undue rise in the pressure in the motor chamber 71.

The operation of the mechanism is as follows:

The parts normally occupy the positions shown in Figures 1 and 3, the rod 49 normally retaining the ball valve 50 off its seat, while the valve 74 is open and the valve 68 is closed. Under such conditions, the higher pressure source will be cut off from the motor chamber 66 and such chamber will communicate around the valve 74 with the motor chamber valve 71, which is in fixed communication with the lower pressure source through the nipple 105. At the same time, the low pressure hydraulic chamber 27 (Figure 1) will be in fixed communication with the high pressure chamber 28.

Operation of the brake pedal 11 to apply the brakes will displace fluid from the master cylinder through line 12 into the chamber 27 from whence brake fluid will flow through passage 48 into chamber 28 and thence through lines 14 to the brake cylinders 15. This flow of fluid normally takes place until the brake shoes are engaged with the drums, such operation requiring little force and resulting in a negligible increase in hydraulic fluid pressure throughout the system. As soon as the shoes engage the drums, further displacement of fluid from the master cylinder will increase the hydraulic pressure throughout the system. While the pressure in the chambers 27 and 28 will be approximately equal, the effective area of the end of the piston 38 in the chamber 27 will be greater than the effective area of the opposite end of the piston, and accordingly this piston will start to move toward the right as viewed in Figure 1.

Movement of the piston 38 will be transmitted to the lever 80 below the fulcrum 86 and the lower end of the lever 80 will move to the right, the freedom of movement of the lower end of the lever 80 depending upon the adjusted tensioning of the spring 98, as will be referred to later. The upper end of the lever 80 will move toward the left as viewed in Figures 1 and 3, and such movement will take place freely with respect to play between the lever 80 and nut 84 up to the limit of such play, while at the same time the spring 75 will move the valve 74 toward its seat. When the ball 74 engages its seat, the chambers 66 and 71 will become disconnected, and engagement of the plate 80 with the nut 84 will exert a pressure on the stem 91 tending to move it toward the left as viewed in Figure 3 against the tension of the spring 93.

In this connection it is pointed out that the spring 93 acts in opposition to the pressure of the air in the bore 56 tending to unseat the valve 68, the tension of the spring 93 normally exceeding the higher fluid pressure but preferably only to the extent necessary to normally maintain the valve 68 seated. Accordingly little force is required for the head 92 to overcome the amount of excess force of the spring 93 over the air pressure in the bore 56 before the ball 68 will start to move from its seat, and the force necessary is not sufficient to be felt by the operator. Accordingly a smooth progressive operation is provided through the "cut-in" point, namely, through the point at which the motor 16 comes into operation. The unseating of the ball 68 admits air into the motor chamber 66, the rate of flow of air depending upon the extent of unseating of the valve 68 which, in turn, is dependent upon the mode of brake pedal operation.

Almost immediately upon initial movement of the piston 38, the ball 50 (Figure 1) will seat to disconnect the hydraulic chambers 27 and 28. The piston 38 then becomes, in effect, a solid piston. Movement of the piston continues so long as fluid is displaced from the master cylinder, and so long as the piston 38 is moved, valve operation will be effected to energize the motor 16. Accordingly the plunger sleeve 34 and associated elements and the piston 38 will function to increase pressure in the chamber 28 and introduce fluid into the brake lines to apply the brakes. The generated brake pressure will be substantially in excess of the pressure generated in the master cylinder, a ratio of the high pressure to the low pressure being determined by the relative areas of the piston 38 and plunger 34 operating to displace fluid from the chamber 28, as will be obvious.

As soon as movement of the piston 38 is arrested incident to the stopping of brake pedal operation, a very slight additional movement of the pressure responsive unit of the motor will result in reversing the tilting of the lever 80 to close the valve 68 to disconnect the motor chamber 66 from the source of higher pressure. Any tendency for the motor to overrun will be instantly checked by the "cracking" of the valve 74 to exhaust air from the motor chamber 66 and thus quickly establish exactly the differential fluid pressure in the motor necessary to hold the pressure responsive unit of the motor in the proper position relative to the piston 38.

The reverse operation when the brake pedal is released will be obvious. The releasing of the brake pedal immediately drops the pressure in the chamber 27, whereupon pressure in the chamber 28 and the force of the spring 104 will tend to move the parts to normal position, initial movement of the piston 38 reversing the motor-energizing movement of the lever 80 to seat the valve 68 (Figure 3) and open the valve 74 to exhaust air from the chamber 66. Just prior to the point at which the piston reaches its "off" position, the rod 49 will engage the end of the cylinder 25, whereupon the slight additional movement of the piston 38 to its "off" position will unseat the ball 50. The latter feature forms per se no part of the present invention but its use is desirable since it permits a free flow of fluid into the brake lines to take up play between the brake shoes and brake drums prior to motor operation, and permits the flow of fluid from the chamber 27 to the chamber 28 to replenish any leakage which may occur in the brake system during the previous brake operation.

The arrangement of the valves and valve operating means in Figure 3 is important. In most prior constructions, there has been a gap between the closing of the low pressure valve and the opening of the high pressure valve, and during such period, appreciable movement of the valve operating piston and associated elements would take place with no operation of the motor. This was noticeable in actual practice for several reasons. In the first place, it required an appreciable movement of the pressure responsive unit of the motor after brake pedal operation had ceased before motor operation would be arrested. While actual movement of the pressure responsive unit of the motor would be slight, it was sufficient to appreciably increase pressure in the high pressure chamber 28 and thus increase the resistance against the operator's foot after he had stopped depressing the brake pedal. A like result in reverse would occur if the operator slacked off on the brake pedal to reduce the braking operation, the pressure responsive unit of the motor overrunning to an extent which was slight but sufficient to drop the resistance on the operator's foot.

The present construction provides for the complete elimination of such disadvantage. The play between the nut 84 and the lever 80 (Figure 3) is preferably very slightly less than the distance through which the valve 74 moves from its normal position to engage the seat 73. Accordingly there is a very slight range in movement of the lever 80 in which both of the valves 68 and 74 are preferably slightly unseated to provide a predetermined leakage which will automatically balance itself whenever brake pedal operation is stopped. An almost infinitesimal movement of the pressure responsive member in either direction at such point will result in overbalancing the leakage through one of the valve seats 67 or 73 with respect to the other, and accordingly proper pressure in the chamber 66 would be reached instantly without any appreciable movement of the pressure responsive member and without affecting pressure in the chamber 28. This fact, coupled with the opposing of the air pressure in the bore 56 by the force of the spring 93, greatly smooths out the operation of the brake mechanism, brake application thus exactly following movement of the brake pedal without any sudden and annoying increases or decreases in reaction pressures on the brake pedal or the requiring of any force by the operator merely to open the air valve.

The use of the spring 98 to oppose movement of the lower end of the lever 80 upon a brake-applying operation of the brake pedal 11 also is important. Obviously, the lower end of the lever 80 must move toward the right in Figure 1 in order for the upper end of the lever to move to the left to effect a valve operation. The freedom with which the lower end of the lever moves toward the right determines the point at which the valves 68 and 74 will come into operation. The greater the tension of the spring 98 the greater will be the manual force necessary to move the piston 38 and energize the motor, and conversely, the lighter the tension of the spring 98, the more freely the lower end of the lever can swing to thus reduce the manually generated force necessary to operate the valves. Thus the spring 98 is important in providing a very simple means whereby the "cut-in" point of the motor 16 may be predetermined. The adjustment of this spring need be made only once, when the apparatus is installed and the plug 103 may be removed for the insertion of a screw driver to engage the screw to turn it to vary the tension of the spring 98. The plug 103 then can be replaced and the brake operation tested.

It will be apparent that the fulcrum point 86 may be arranged at any desired distance above the axis of the piston 38 to determine the degree of movement of the upper end of the lever 80 relative to the piston 38. In the embodiment of the invention illustrated, the lever length above the fulcrum 86 is approximately two and one-half times the lever length from the fulcrum 86 to the point of engagement of the lever with the ring 84. Accordingly any movement of the piston 38 will be more than doubled at the valve operating point, thus providing rapid valve operation and rapid response of the motor to pedal movements. This lever ratio obviously may be increased by placing the ribs 86 at a lower point.

From the foregoing, it will be apparent that the present invention provides a particularly smooth-operating power unit for applying the brakes of a motor vehicle or for similar purposes. The building up of resistance against pedal movement is progressive and not "lumpy" as is true where substantial force is necessary to unseat the high pressure valve at the motor "cut-in" point. Moreover, the "dead point" in motor operation between the respective opening and closing of the high pressure valves is eliminated, thus making the motor action as "maneuverable" as the brake pedal. In other words, a movement of the brake pedal, for example, from a partially applied brake position to a position increasing the brake application, will result in a corresponding operation of the motor, it being unnecessary to compensate for the "dead" spot in other devices of this character. The degree of leakage occurring when both valves 68 and 73 are at the balanced point may be adjusted by adjusting the position of the nut 94 on the valve stem 91, as will be apparent.

In the event of a failure of power, manual movement of the piston 38 will cause the snap ring 39 to engage the ring 35, in which case the latter ring and its seal 40 will move as a unit with the piston 38. Under such conditions, the ring 84 will move the lever 80 until its limit of movement is reached whereupon it will effect movement of the pressure responsive unit of the motor, but the latter, of course, will perform no work. In practice, the cross-sectional area of the chambers 27 and 28 are equal to each other and to the cross-sectional area of the piston of the master cylinder and upon a failure of power, therefore, a conventional manual operation of the brake pedal will take place, the same amount of fluid being displaced from the master cylinder as in a conventional operation of the present apparatus, or as in a conventional operation of an ordinary hydraulic brake system.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. An operating mechanism for a hydraulic vehicle brake system having wheel cylinders to apply the brakes and a pedal-controlled master cylinder, a booster unit connected between the master cylinder and the wheel cylinders and comprising a fluid pressure motor having a pressure responsive unit therein dividing it into chambers and operative for boosting the pressure transmitted to the wheel cylinders upon energization of said motor, a pair of valves for controlling pressures in one of said chambers relative to the other, a member movable by fluid displaced from the master cylinder, a lever engageable with said fluid responsive member, said lever being fulcrumed between its point of engagement with said fluid responsive member and one end of said lever, and motion transmitting connections between said end of said lever and the respective valves, one of said motion transmitting connections being adjustable relative to said lever to vary the point of opening of its associated valve relative to the point of closing of the other valve.

2. An operating mechanism for a hydraulic vehicle brake system having wheel cylinders to apply the brakes and a pedal-controlled master cylinder, a booster unit connected between the master cylinder and the wheel cylinders and comprising a fluid pressure motor having a pressure responsive unit therein dividing it into chambers and operative for boosting the pressure transmitted to the wheel cylinders upon energization of said motor, a pair of valves for controlling pressures in one of said chambers relative to the other, means operable by fluid displaced from the master cylinder for operating said valves, said means comprising a valve operating lever having motion transmitting connection with one of said valves, and lost motion means connecting said lever to the other valve to operate it, said lost motion means being adjustable to vary the point of opening of said last named valve relative to the point of closing of the other valve, and a spring device engaging said pressure responsive unit and said lever to oppose movement of the latter upon displacement of fluid from the master cylinder, said spring device being adjustable to predetermine the pressure in said master cylinder necessary to move said lever to operate said valves.

3. An operating mechanism for a hydraulic vehicle brake system having wheel cylinders to apply the brakes and a pedal-controlled master cylinder, a booster unit connected between the master cylinder and the wheel cylinders and comprising a fluid pressure motor having a pressure responsive unit therein dividing it into chambers and operative for boosting the pressure transmitted to the wheel cylinders upon energization of said motor, a pair of valves for controlling pressures in one of said chambers relative to the other, a member movable by fluid displaced from the master cylinder, a lever engageable with said fluid responsive member, said lever being fulcrumed between its point of engagement with said fluid responsive member and one end of said lever, motion transmitting connections between said end of said lever and the respective valves, one of said motion transmitting connections being adjustable relative to said lever to vary the point of opening of its associated valve relative to the point of closing of the other valve, a spring device engaging said pressure responsive unit and said lever adjacent the other end thereof, said spring device being adjustable to predetermine the master cylinder pressure necessary to move said pressure responsive member and effect a valve-operating movement of said lever.

4. An operating mechanism for a hydraulic vehicle brake system having wheel cylinders to apply the brakes and a pedal-controlled master cylinder, a booster unit connected between the master cylinder and the wheel cylinders and comprising a fluid pressure motor having a pressure responsive unit therein dividing it into chambers and operative for boosting the pressure transmitted to the wheel cylinders upon energization of said motor, one of said chambers being connected to a source of relatively low pressure, a normally open low pressure valve for controlling communication between said chambers, a normally closed higher pressure valve for controlling communication between the other chamber and a source of higher pressure, spring means biasing said higher pressure valve to closed position against the pressure of said source, a lever, means for moving said lever upon displacement of fluid from the master cylinder, and a pair of elements operable by said lever for moving said valves, one of said elements directly engaging said lever and said low pressure valve to close the latter upon initial movement of said lever, the other element engaging said higher pressure valve, and lost motion means connecting said last named element to said lever to overcome the tension of said spring means whereby pressure in said source will open said higher pressure valve.

5. Apparatus constructed in accordance with claim 4 provided with a spring device carried by said pressure responsive unit and engaging said lever to resiliently oppose valve operating movement thereof.

6. An operating mechanism for a hydraulic vehicle brake system having wheel cylinders to apply the brakes and a pedal-controlled master cylinder, a booster unit connected between the master cylinder and the wheel cylinders and comprising a fluid pressure motor having a pressure responsive unit therein dividing it into chambers and operative for boosting the pressure transmitted to the wheel cylinders upon energization of said motor, one of said chambers being connected to a source of relatively low pressure, a normally open low pressure valve for controlling communication between said chambers, a normally closed higher pressure valve for controlling communication between the other chamber and a source of higher pressure, spring means biasing said higher pressure valve to closed position against the pressure of said source, a pressure operable means movable by fluid displaced from the master cylinder, a lever fulcrumed with respect to said pressure responsive unit and engagable by said pressure operable member to be moved thereby, and a pair of valve operating rods for transmitting movement from said lever to said valves, one of said rods engaging said lever and said low pressure valve to move the latter to closed position upon initial movement of said lever, the other rod having lost motion connection with said lever and engaging said spring means to overcome the tension thereof whereby the pressure of said source will open said higher pressure valve, said lost motion connection being adjustable to predetermine the point of opening movement of said higher pressure valve relative to the point of closing movement of said low pressure valve.

7. Apparatus constructed in accordance with claim 6 provided with a spring device engaging said lever to oppose valve operating movement thereof, and means for adjusting the tension of said last named means to predetermine the pressure necessary to move said pressure responsive member to effect a valve-operating movement of said lever.

8. An operating mechanism for a hydraulic vehicle brake system having wheel cylinders to apply the brakes and a pedal-controlled master cylinder, a booster unit connected between the master cylinder and the wheel cylinders and comprising a fluid pressure motor having a pressure responsive unit therein dividing it into chambers and operative for boosting the pressure transmitted to the wheel cylinders upon energization of said motor, one of said chambers being connected to a source of relatively low pressure, a normally open low pressure valve for controlling communication between said chambers, a normally closed higher pressure valve for controlling communication between the other chamber and a source of higher pressure, spring means biasing said higher pressure valve to closed position against the pressure of said source, a piston movable by fluid displaced from the master cylinder, a lever engaged by said piston, means on said pressure responsive unit engaging said lever to act as a fulcrum therefor and spaced toward one end of the lever from the point of engagement of the latter with said piston, and a pair of devices engageable with the last named end of said lever to operate said valves, one of said devices directly transmitting movement of said lever to said low pressure valve to close the latter upon initial movement of said lever and the other device having lost motion connection with said lever and being operative for overcoming the tension of said spring means whereby said higher pressure valve will be opened by pressure of said source, and means for adjusting said lost motion connection to vary the point of opening of said higher pressure valve relative to the point of closing of said low pressure valve.

9. Apparatus constructed in accordance with claim 8 wherein said pair of devices comprises rods one of which has its respective ends engaging one face of said lever and said low pressure valve to close the latter upon initial movement of said lever, the other rod projecting through said lever and engaging said higher pressure valve, said spring means engaging said other rod, and an adjusting nut on the end of said other rod which projects through said lever, said nut being engageable by said lever to move said rod and overcome the tension of said spring means whereby pressure in said source will open said higher pressure valve, said nut being adjustable on said last named rod to predetermine the point of opening movement of said higher pressure valve relative to closing movement of said low pressure valve.

10. Apparatus constructed in accordance with claim 8 provided with a spring device carried by said pressure responsive unit and engaging the other end of said lever to oppose valve operating movement thereof, said spring device being adjustable to predetermine the force of said piston necessary to effect a valve operating movement of said lever.

WILLIAM STELZER.

REFERENCES CITED

The following references are of record in the file of this patent:

UNITED STATES PATENTS

| Number | Name | Date |
| --- | --- | --- |
| 741,261 | Ledermann | Oct. 13, 1903 |
| 1,809,491 | Rowell | June 9, 1931 |
| 2,323,788 | Boldt | July 6, 1943 |
| 2,353,755 | Price | July 18, 1944 |
| 2,377,699 | Klimkiewicz | June 5, 1945 |

OTHER REFERENCES

Commercial Car Journal, page 64, issue of September 1943; Publ. Chilton Co., Philadelphia, Pa.